Dec. 5, 1961  L. D. FURON  3,011,339
FLAW DETECTION APPARATUS
Filed Nov. 7, 1957  3 Sheets-Sheet 1

INVENTOR.
LEON D. FURON
BY
*Christie, Parker & Hale*
ATTORNEYS

Dec. 5, 1961 L. D. FURON 3,011,339
FLAW DETECTION APPARATUS
Filed Nov. 7, 1957 3 Sheets-Sheet 2

INVENTOR.
LEON D. FURON
BY
Christie, Parker & Hale
ATTORNEYS

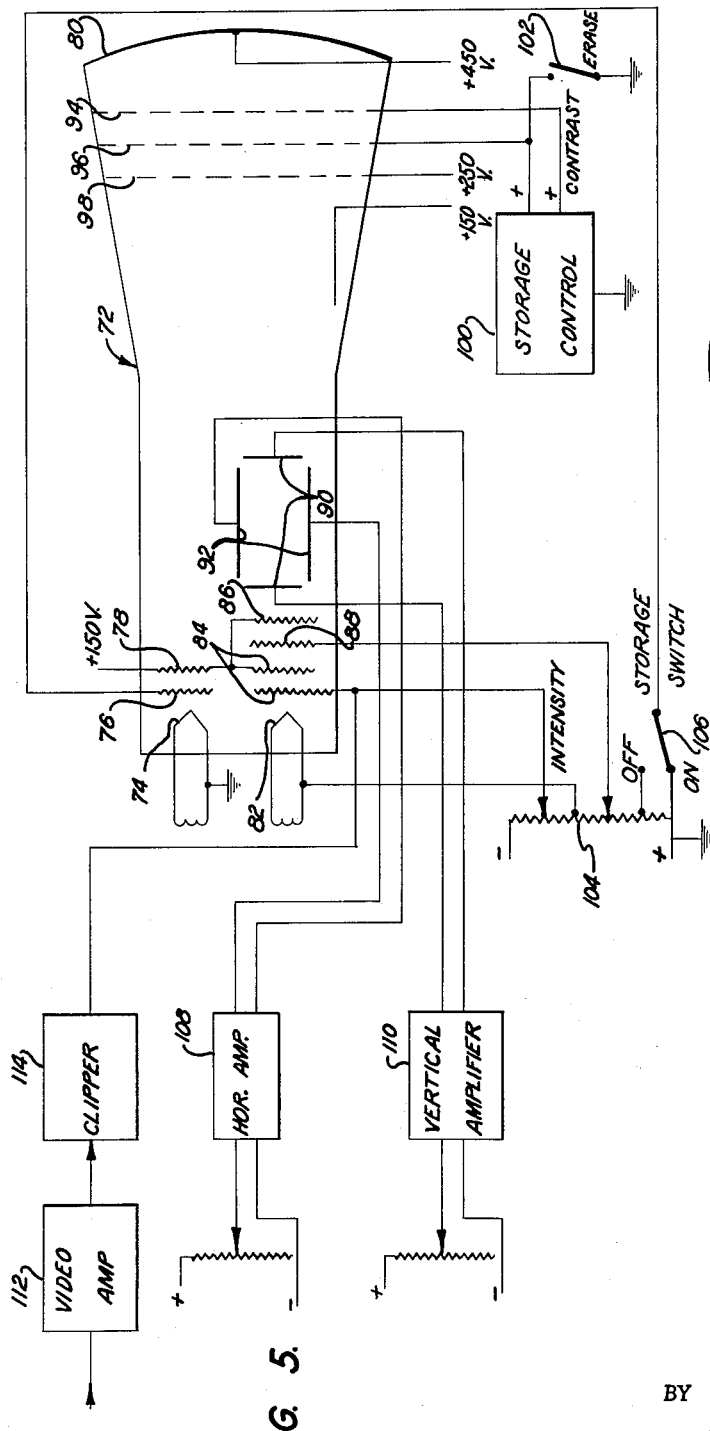
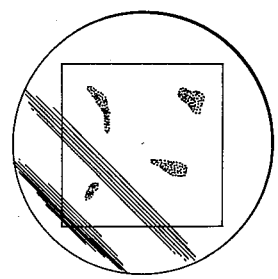
FIG. 5.
FIG. 6
INVENTOR.
LEON D. FURON

United States Patent Office 3,011,339
Patented Dec. 5, 1961

3,011,339
FLAW DETECTION APPARATUS
Leon D. Furon, Glendale, Calif., assignor to Automation Instruments Inc., Pasadena, Calif., a corporation of California
Filed Nov. 7, 1957, Ser. No. 694,955
2 Claims. (Cl. 73—67.9)

This invention relates to ultrasonic flaw detection apparatus, and more particularly, is concerned with apparatus for indicating the position of flaws in a bonded structure.

The use of ultrasonic sound waves to detect the presence of flaws in certain materials has heretofore been proposed as a non-destructive flaw detecting technique. For example, in many instances it is desirable to determine whether or not two laminated members are satisfactorily bonded together. There are a number of types of sandwich constructions in which sheets of laminated materials are furnace-brazed or cemented by resin or plastic cements. It is desirable to detect the presence of poor bonding and to locate the exact point where the points of poor bonding are located.

Because ultrasonic waves are highly attenuated in air, it is necessary that the detecting be done in water or other suitable ultrasonic coupling medium. The transducer is immersed in the liquid as well as the laminated structure to be tested. The transducer is moved over the entire surface of the test structure and point by point flaw measurements are made. Flaw indications are correlated with the position of the transducer so that the location of flaws can be pinpointed as to location in the structure.

The present invention provides improved apparatus for scanning the test structure and producing an indication of the presence of flaws and their relative location in the test structure. The present invention makes it possible to test laminated structures in a much shorter time and provides a greatly improved indication of the presence of flaws and their location in the structure being tested.

The invention includes a tank filled with an acoustic coupling medium, such as water, in which the laminated structure is immersed. A transducer is mounted for universal movement in a plane above the test structure, the transducer being immersed in the water. The transducer is pulsed and the reflections utilized to produce a video signal indicative of the presence or absence of flaws in the beam of ultrasonic energy. The transducer is scanned over the area of the test structure and signals indicative of the position of the transducer are generated. A storage type cathode ray tube indicator is used in which the horizontal and vertical deflections of the cathode ray beam are controlled by position-indicative signals generated by means responsive to the position of the transducer. The video signal derived from the transducer is used to intensity modulate the beam of the storage type cathode ray tube.

For a more complete understanding of the invention, reference should be had to the accompanying drawings, wherein:

FIG. 5 is a schematic diagram of the indicator; and

FIG. 6 is a typical display pattern produced on the screen of the storage tube.

Figure 1:
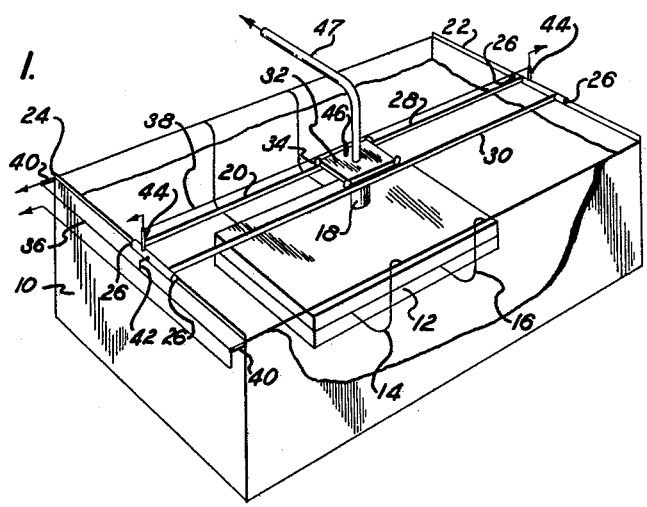
FIG. 1 is a perspective view, partly cut away, illustrating the testing tank structure.

Referring to FIG. 1 in particular, the numeral 10 indicates generally a metal tank which may be rectangular in form and of any suitable size, depending upon the size of the structures to be tested. The tank is filled with a suitable acoustic coupling medium such as water. The test sample structure, such as indicated at 12, is completely immersed in the water but is separated from the bottom surface of the tank, as by suitable support means such as indicated at 14 and 16. An ultrasonic transducer element 18 is suspended in the water above the sample 12. The transducer preferably is of a type employing a quartz or barium titanate crystal, which may be mechanically vibrated in response to electrical signals of frequencies in the megacycle range.

The transducer 18 is mounted for universal movement in a plane parallel to the upper surface of the laminated test structure 12. To this end a bridge structure 20 is provided, which extends between side rails 22 and 24, on either side of the tank. The bridge structure is guided on the side rails by suitable guide wheels 26. The bridge structure 20 includes a pair of parallel rails 28 and 30 from which the transducer is supported by means of a small truck assembly 32 having guide wheels 34 which engage the rails 28 and 30. Thus universal movement of the transducer in a plane may readily be provided, either manually or by suitable motor drive means if so desired.

For the purpose of producing a voltage indicative of the X and Y coordinant positions of the transducer 18, a pair of slide wires 36 and 38 may be provided for example. The slide wire 36 is supported along the side rail 24 by insulators 40 which support the slide wire in spaced relationship from the side of the tank. A sliding contact 42 carried by the bridge assembly 20 engages the slide wire 36 to form a potentiometric position indicating device.

Similarly, the slide wire 38 is supported at its ends from the carriage 20 by standoff insulators 44 at either end thereof. A sliding contact 46, insulatedly supported from the truck assembly 32, engages the slide wire 38. Thus a potentiometric device is provided for deriving a position indicating signal. Leads 47 from the contact 46 and the transducer 18 are brought out from the trunk 32 as indicated.

Figure 2:
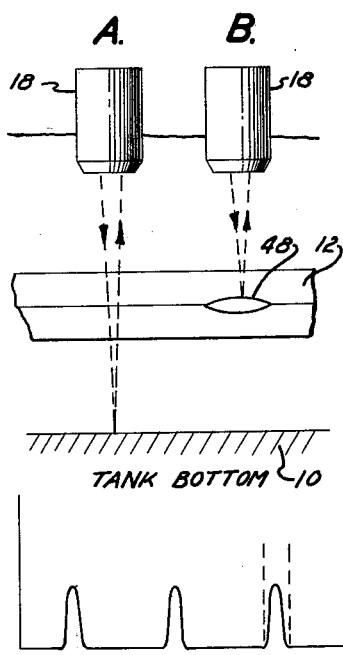
FIG. 2 is a simplified drawing showing the method of detecting flaws in a laminated structure.

Referring to FIG. 2, the principle of operation is therein illustrated. A portion of the test structure 12 is shown as having two bonded layers, with a flaw being indicated at 48 as an air space between the two laminations or layers. With the transducer 18 located in position A, the sound wave is propagated down through the test structure 12. A considerable amount of the energy is reflected back to the transducer by the front face. More of the energy is reflected back at the inner face between the layers and at the back face. The remaining energy is propagated onto the bottom of the tank and is reflected back through the test structure to the transducer 18. Of course multiple reflections occur at the various surfaces in response to the reflected wave as well as to the direct wave. By looking at the output from the transducer 18 at a fixed time interval following the pulsing of the transducer 18, the presence of the main reflected wave from the tank bottom can be detected.

However, if a flaw, providing an air space, exists anywhere in the laminated structure 12, as between the layers as indicated at 48, practically no energy is received from reflection off the tank bottom. The reason is that the air space 48 highly attenuates any energy propagated through the flaw. Although the flaw tends to reflect energy back to the transducer 18, the reflected wave from the flaw obviously returns to the transducer 18 in a shorter time than the wave normally reflected off the tank bottom, and therefore may be easily distinguished, by proper gating, from the reflection off the tank bottom. Thus it will be seen that in the presence of a flaw within the structure being tested, substantially no energy is received by the transducer 18 at the time corresponding to the normal reflection off the tank bottom.

Figure 3:
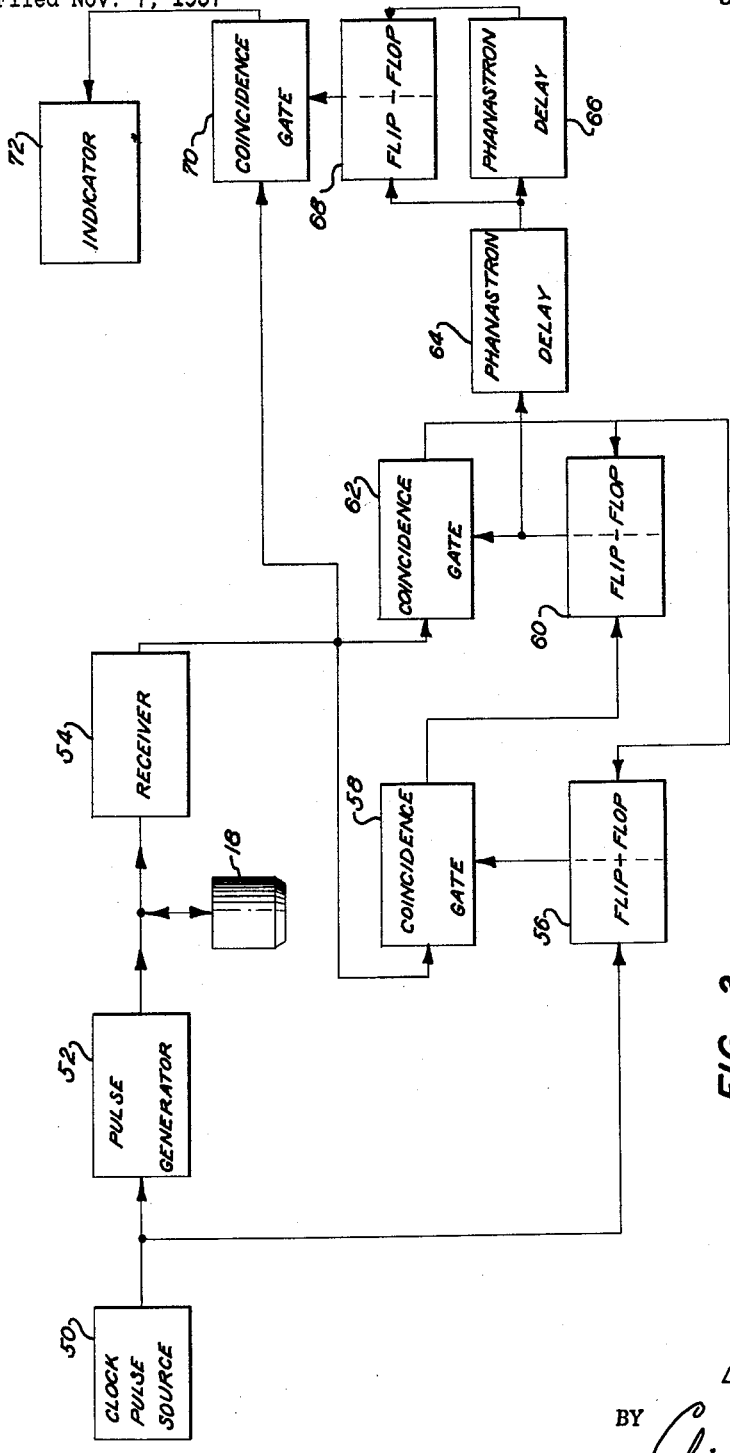
FIG. 3 is a circuit block diagram used in practicing the invention.

Referring to FIG. 3, a control circuit for operating the transducer 18 and deriving an indication therefrom is shown in block from. A clock pulse source 50 establishes the repetition rate at which the transducer 18 is pulsed. The output from the clock pulse source 50 synchronizes a pulse generator circuit 52. The output pulses from the generator 52 are applied to the transducer 18 and act to trigger the crystal of the transducer into oscillation. The transducer crystal rings for several cycles at its natural frequency, which may be of the order of several megacycles, generating compression or sound waves of that frequency in the acoustic coupling medium of the tank. The ultrasonic waves then reflected back to the transducer 18 mechanically vibrate the crystal of the transducer 18, producing an RF output signal which is fed to a receiver 54.

Figure 4:
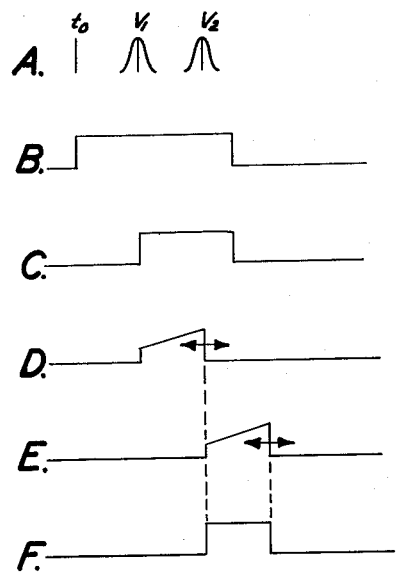
FIG. 4 is a series of wave forms generated in the circuit of FIG. 3.

The receiver 54 may be a superheterodyne type for deriving output pulses corresponding to the envelopes of the bursts of RF energy derived from the transducer 18. Thus the output pulses from the receiver 54 correspond in time to the several reflections picked up by the transducer 18. FIG. 4a shows a wave form of a typical output signal from the receiver 54 during one pulse repetition interval of the source 50.

In order to determine whether a flaw is present or not, according to the principles of the invention as discussed above in connection with FIG. 2, it is necessary to gate the output from the receiver 54 at the proper time to determine whether a reflection from the bottom of the tank is present or not. To this end the output of the clock pulse source 50 is applied to one side of a bistable multivibrator or flip-flop circuit 56. The flip-flop circuit 56 controls a coincidence gate 58 to which is applied the output of the receiver 54. With the flip-flop triggered to its proper stable state for opening the coincidence gate 58, any output pulses derived from the receiver 54 may be passed by the gate 58. The "on" time of the coincidence gate 58 is indicated by the wave form of FIG. 4b.

The first main pulse put out by the receiver 54 is the pulse produced by reflection from the front surface of the test structure. This front surface pulse is passed by the coincidence gate 58 to a second flip-flop circuit 60. The flip-flop circuit 60 controls a second coincidence gate 62 such that when the flip-flop 60 is actuated by the first received pulse passed by the coincidence gate 58, the coincidence gate 62 is caused to open. The "on" time of the coincidence gate 62 is indicated by the wave form of FIG. 4c.

The coincidence gate 62 is also coupled to the output of the receiver 54 so that the next pulse following the front surface pulse derived from the receiver 54 is passed by the coincidence gate 62 and applied to the flip-flop circuit 56. The pulse passed by the coincidence gate 62 resets the flip-flop 56 to its initial condition, closing the coincidence gate 58. It is also applied to the flip-flop circuit 60 for closing the coincidence gate 62.

The initial pulse from the receiver 54, corresponding to the front surface reflection, in actuating the flip-flop 60, produces a pulse which is coupled to a phantastron delay circuit 64. The phantastron delay circuit 64 is of conventional circuit design which produces a variable delay controlled by adjusting a D.C. bias level in the circuit. The output waveform is shown in FIG. 4d. The output from the phantastron delay circuit 64 is fed to a second phantastron delay circuit 66.

The output waveform of the second phantastron is shown in FIG. 4e. The output from the delay circuit 64 and the output of the delay circuit 66 are applied to opposite sides of a flip-flop 68 which controls a coincidence gate 70. The coincidence gate 70 is turned on in response to the first delay pulse derived from the delay circuit 64 and is turned off a time interval later determined by the delay circuit 66 as shown by the gating waveform of FIG. 4f. The output of the receiver 54 is connected to the coincidence gate 70 for gating a selective portion of the received signal during each period of the clock source 50. It will be appreciated that by proper setting of the delay circuits 64 and 66, the coincidence gate 70 can be arranged to gate the portion of the receiver output corresponding to the pulse reflected off the bottom of the tank, since this pulse occurs at substantially a fixed time interval following the initiation of an ultrasonic signal by the clock pulse source 50.

The output from the coincidence gate 70 is applied to an indicating device 72, as shown in FIG. 5. The indicating device comprises a direct-view storage tube such as described in the article "A Memory Tube" by A. V. Haeff, Electronics, vol. 20, pp. 80–83, September 1947. The storage tube is characterized by the fact that it presents a visual black-and-white display of infinite persistence. A regenerative action is built into the tube so that the parts of the pattern which are white are maintained white, and those which are black are maintained black. A cathode ray storage tube of this type comprises two guns; one is the writing gun, and the other is the flood gun. The flood gun is indicated as including a cathode 74, control grid 76, and accelerating electrode 78. The flood gun is arranged to direct electrodes uniformly over the whole surface of the target screen 80. The writing gun also includes a cathode 82, control grid 84, accelerating electrodes 86, and focusing electrode 88 for directing the electrons in a focused beam. Horizontal and vertical electrostatic deflection plates 90 and 92 are provided for varying the position of the beam in the manner of a conventional cathode ray tube.

In the front of the screen 80 are positioned a storage screen 94, a collector screen 96, and an ion repeller screen 98. The storage grid 94 is normally held at a potential which prevents the passage of electrons from the flood gun from reaching the target 80. The potential is set by a storage control circuit 100. However, where the writing beam strikes the storage grid 94, the screen is caused to go positive as a result of secondary emission electrons which are attracted to the collector grid 96. The regions in which the storage surface is charged positively by the action of the writing gun permit the passage of electrons from the flood gun. The flood electrons which pass through the positively charged areas are accelerated to high velocity and strike the viewing screen phosphor, producing a continuously visible image of the pattern electrically stored on the dielectric surface of the storage screen 94.

Erasing takes place by momentarily connecting the collector grid 96 to ground by means of an erase switch 102.

Potentials on the various grids of the guns are controlled by a voltage divider 104 connected across a negative potential source. A switch 106 biases the flood gun on and off, the switch being turned on when it is desired to reproduce or store a signal on the screen 80.

The horizontal and vertical deflection plates are controlled by the slide wires 38 and 36 through horizontal and vertical amplifiers 108 and 110 respectively. A video pulse derived from the output of the receiver 54 is amplified through a suitable video amplifier 112, clipped in a clipping circuit 114, and applied to the control grid 84 of the writing gun. Thus it will be seen that the writing beam is positioned on the screen according to the position of the transducer relative to the surface of the test material. By turning the writing beam on in response to the video signal, the positions of flaws are reproduced on the screen as dark spots, since no video signal is produced when a flaw occurs in the sample in line with the ultrasonic beam. A typical storage tube pattern produced by a sample structure is shown in FIG. 6.

It will be recognized from the above description that flaw detection apparatus is provided which produces a two dimensional picture of the test material and the relative location of flaws. By virtue of the storage tube display, the transducer can be scanned mechanically over the whole area of the test structure and because of the infinite persistence of the tube, a complete visual image of the area scanned can be generated. If desired, the image can then be photographed for a permanent record of the flaw pattern of the test material. By enlarging the photograph to the same scale as the test structure the location of flaw can be directly determined by laying the enlarged photo on the test material. Thus it will be seen that the apparatus presents the flaw information in a highly useful form for the purpose of quality control, improving production techniques in bonded materials, and establishing quality standards.

What is claimed is:

1. Ultrasonic inspection apparatus for locating flaws in laminated structures comprising a tank having a substantially flat bottom, a liquid in the tank, the test structure being immersed in the liquid but spaced from the bottom of the tank, an ultrasonic transducer for converting electric signals to ultrasonic signals or ultrasonic signals to electric signals, the transducer being immersed in the liquid and oriented to direct ultrasonic waves at the bottom of the tank and receive ultrasonic waves reflected from the bottom of the tank, means for normally supporting the transducer in a plane parallel to the tank bottom for scanning the transducer over any selected area of the tank, the test structure being located in the tank between the transducer scanning area and the bottom, means for electrically pulsing the transducer periodically, means for deriving an electrical output signal from the transducer in response to reflections of the ultrasonic pulses of energy produced by pulsing of the transducer, a cathode ray storage tube indicator means capable of storing an image for an indefinitely long period of time, means responsive to movement of the transducer along two mutually perpendicular axes for positioning the cathode ray beam of the tube along two mutually perpendicular axes on the face of the tube in response to the positioning of the transducer, whereby the beam is positioned on the tube face in direct relation to the two-dimentional position of the transducer, means for biasing on the beam only in response to output signals from the transducer, and delayed gating means synchronized with the pulsing of the transducer for coupling the output signals derived from the transducer to bias on the beam of the memory tube a delayed interval of time corresponding to the transmission time of ultrasonic waves traveling from the transducer to the bottom of the tank and back to the transducer.

2. Ultrasonic inspection apparatus for visually displaying the location of flaws in a relatively thin laminated structure, comprising means for supporting the laminated structure, an ultrasonic transducer for converting electric signals to ultrasonic signals or ultrasonic signals to electric signals, transducer support means for effecting two-dimensional movement of the transducer over the surface extent of the laminated structure, means coupled to the transducer for periodically pulsing the transducer, means coupled to the transducer for deriving an electrical output signal from the transducer in response to reflections of the ultrasonic pulses of energy produced by pulsing of the transducer, cathode ray beam memory storage tube means capable of retaining a visual image for any desired period of time, said storage tube means including means for varying the intensity of the cathode ray beam and first and second beam deflection means for positioning the beam in two dimensions, means actuated by movement of the transducer for generating a first signal proportional to a first coordinate of position of the transducer in relation to the test structure, the first signal being coupled to said first beam deflection means, means actuated by movement of the transducer for generating a second signal proportional to a second coordinate of position of the transducer in relation to the test structure, the second signal being coupled to said second beam deflection means, and gating means synchronized with the pulsing of the transducer for coupling a selected portion of the output signals derived from the transducer to the beam intensity varying means.

References Cited in the file of this patent

UNITED STATES PATENTS

| 2,593,865 | Erdman | Apr. 22, 1952 |
| 2,700,895 | Carson | Feb. 1, 1955 |

FOREIGN PATENTS

| 696,920 | Great Britain | Sept. 9, 1953 |
| 718,291 | Great Britain | Nov. 10, 1954 |
| 523,550 | Italy | Apr. 16, 1955 |
| 535,714 | Belgium | June 1, 1955 |

UNITED STATES PATENT OFFICE
CERTIFICATE OF CORRECTION

Patent No. 3,011,339                                        December 5, 1961

Leon D. Furon

It is hereby certified that error appears in the above numbered patent requiring correction and that the said Letters Patent should read as corrected below.

Column 5, line 25, for "normally" read -- movably --.

Signed and sealed this 1st day of May 1962.

(SEAL)
Attest:

ERNEST W. SWIDER                                        DAVID L. LADD
Attesting Officer                                            Commissioner of Patents